United States Patent [19]

Rozenwaig

[11] Patent Number: 4,549,313

[45] Date of Patent: Oct. 22, 1985

[54] SUPERVISORY DEVICE FOR AN OPTOELECTRONIC SWITCHING NETWORK

[76] Inventor: Boris Rozenwaig, 8, rue P. J. Redouté 92360 Meudon la Foret, France

[21] Appl. No.: 463,657

[22] Filed: Feb. 3, 1983

[30] Foreign Application Priority Data

Feb. 3, 1982 [FR] France ................................ 82 01737

[51] Int. Cl.$^4$ .............................................. H04B 9/00
[52] U.S. Cl. .................................. 455/600; 455/612; 350/96.13
[58] Field of Search .................... 455/600, 612; 370/1, 370/2, 3, 4; 350/96.13

[56] References Cited

U.S. PATENT DOCUMENTS 4,437,190  3/1984  Rozenwaig et al. ................ 455/607

FOREIGN PATENT DOCUMENTS

WO80/01028  5/1980  PCT Int'l Appl. ................ 455/600

*Primary Examiner*—Robert L. Griffin
*Assistant Examiner*—Timothy K. Greer
*Attorney, Agent, or Firm*—Lowe, King, Price & Becker

[57] ABSTRACT

An optoelectronic switching network comprises a transmit board (10), a receive board (40) and an optical projection system (3). The transmit board is formed by plural transmit units, each including a light source (11). The receive board is formed by plural receive units (41), each including plural optoelectronic cells. The optical system projects an image of the transmit board onto the receive units so that in each receive unit the images of the sources of the transmit board coincide with the optoelectronic cells of the receive units. An optoelectric cell is thus activated by an illuminated light source. In each receive unit, a light source illuminates the receive units when a cell thereof is activated, and a supervision receive unit (60) supervises the optoelectronic cells (62) having projected thereon images of the receive units.

4 Claims, 4 Drawing Figures

SUPERVISORY DEVICE FOR AN OPTOELECTRONIC SWITCHING NETWORK

BACKGROUND OF THE INVENTION

1. Field of the Invention

The present invention relates to an optoelectronic switching network intended for switching optical signals.

2. Description of the Prior Art

Optoelectronic switching networks are known particulaly from the U.S. Patent Application Ser. No. 196,083 filed July 8, 1980, now U.S. Pat. No. 4,437,190 for switching signals conveyed by optically modulated light beams. These switching networks comprise:

a transmit board formed of a plurality of transmit units each including a light source, the light sources are respectively linked to incoming lines and arranged in matrix-form on the transmit board;

a receive board formed of a plurality of receive units each including a plurality of optoelectronic detectors or cells, the optoelectronic detectors are respectively linked to outgoing lines and arranged in matrix-form in the receive unit; and optical means for projecting the transmit board image onto each of the receive units such that the light source images coincide with the optoelectronic detectors of the receive units.

By assigning A, B, C, D, ... to subscribers connected to the switching network via incoming and outgoing lines, the light sources and the receive units corresponding to these subscribers, and by assigning a, b, c, d, ... to the optoelectronic detectors of each receive unit, all the detectors a to d of the receive unit A can be selectively connected to the subscriber A, all the detectors a to d of the receive unit B can be selectively connected to the subscriber B, all the detectors a to d of the receive unit C can be selectively connected to the subscriber C and all the detectors a to d of the receive unit D can be selectively connected to the subscriber D. A bilateral communication between the subscribers A and B runs in one direction via the source A and the optoelectronic detector a of the receive unit B and in the other direction via the source B and the optoelectronic detector b of the receive unit A.

The transmit board in the prior art optoelectronic switching network comprises additional sources connected to tone generators and dialing generators. The receive units comprise additional optoelectronic detectors corresponding to these sources and which coincide with the images of the said additional sources via the optical means. Lastly, the receive board comprises an additional receive unit referred to as functionally connected to a central control unit.

As a result of the functional receive unit, the central control unit can supervise the transmit board sources by scanning the functional receive unit optoelectronic detectors and by taking account of the fact that when a transmit board source is illuminated, this corresponds to an active optoelectronic detector.

Thus as is seen in a recap on the former art which will be made later, the connection in a receive unit of a given detector a to d to the output line from this receive unit comes about locally at the very receive unit stage with no intervention on the part of the central control unit. The latter central control unit therefore has no supervision over the receive unit optoelectronic detectors as it has over the transmit board sources through the functional receive unit.

SUMMARY OF THE INVENTION

The leading object of the invention hereof is to provide a central control unit having such supervision over the receive units detectors.

With this in mind, any receive unit in which an optoelectronic detector is connected to the receive unit output line is made luminous and the thus illuminated receive units are projected onto a supervision receive unit. In this way, the optoelectronic detectors are supervised as were the light sources in the prior art.

A further object of the invention is to reduce the angle of observation of the transmit board seen by the most off-set receive units without increasing the distance between the transmit and receive boards in order to reduce image distortion which is heavily accentuated as the angle of observation widens.

With a view to satisfying this object, an optoelectronic switching network with multicell receive units according to the invention is characterized in that the receive board is divided into at least two sub-boards each of which embraces a sub-assembly of the multicell receive unit assembly and in that it comprises semi-reflecting means making it possible to obtain transmit board images, where the transmit board and its images are each axially observed by one of the receive sub-boards through said semi-reflecting means.

BRIEF DESCRIPTION OF THE DRAWINGS

The invention will now be described in detail with reference made to the accompanying drawings in which:

FIG. 1 is a diagram of an optoelectronic switching network as in the prior art U.S. Patent above referred to;

DESCRIPTION OF THE PREFERRED EMBODIMENTS AND THE PRIOR ART OF FIG. 1

Figure 1:
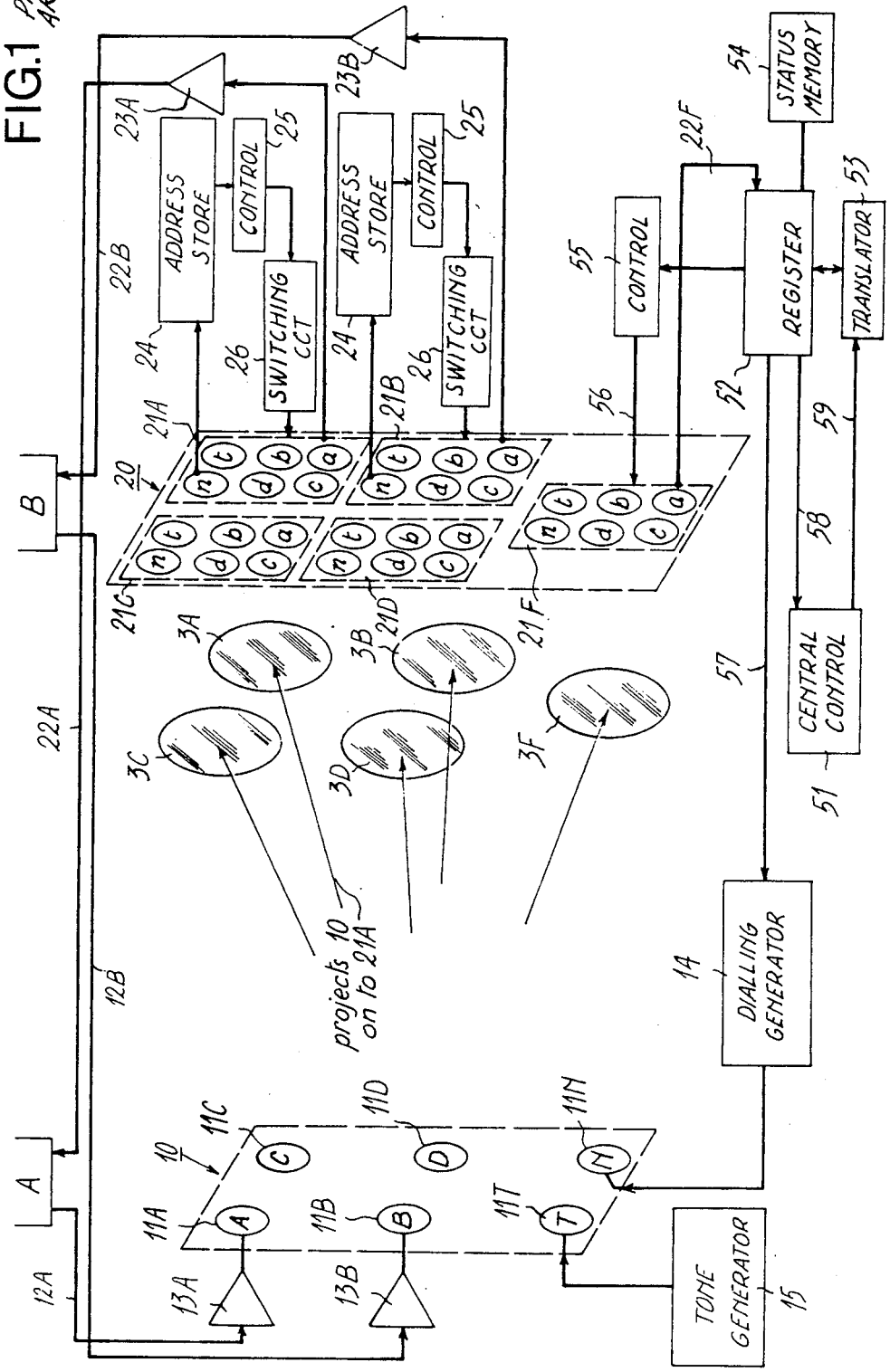

With reference to FIG. 1, the incoming 12 and outgoing 22 subscriber lines are optical fibers or coaxial cables. The transmit units (light sources) 11 of the transmit board 10 are optoelectronic transducers, such as light emitting diodes arranged in matrix form. The receive board 20 include of a plurality of multicell receive units 21 that are random-access photodiode matrices. Each subscriber is therefore connected by an incoming line 12 to a light emitting diode 11 and by an outgoing line 22 to a photodiode assembly 21. The subscribers A and B are, for instance, connected to the sources 11A and 11B respectively by means of the incoming lines 12A and 12B and amplifiers 13A and 13B. The subscribers A and B are also connected to the receiving units 21A and 21B by means of the outgoing lines 22A and 22B and through the amplifiers 23A and 23B.

Each receive unit 21 is fitted with a lens 3 which projects the transmit board 10 image thereon. In this case, the light sources 11 are arranged such that the image from each source is projected onto a cell occupying the same position throughout all the receive units 21. Putting this in other terms, the source A image is projected onto the cell a of all the receive units 21, and the source B image is projected onto the cell b of all the receive units 21, etc.

The transmit board 10 further comprises the following additional components:

at least one light emitting diode 11T intended for emitting tone light signals;

at least one light emitting diode 11N intended for emitting dialing light signals.

The light emitting diodes 11T and 11N correspond to conjugate receive unit cells t and n in each receive unit 21. Receive board 20 further comprises a functional receive unit 21F whose rôle will be discussed further on. The photodiodes of the receive unit 21F are optically conjugate with the transmit board sources via a lens 3F.

In each receive unit 21, the cell n is linked to an address recognizing circuit 24. This address recognizing circuit 24 is connected to a control circuit 25, itself connected to a switching circuit 26. The circuit 24 reads the address received by the cell n and the circuit 25 receiving this address sends control signals along a row bus and a column bus in the photodiode matrix 21. The circuit 26 is described in FIG. 4 of the afore-mentioned patent. It brings about connection of one of the cells a, b, c, d, . . . with the outgoing line 22.

The optoelectronic switching network depicted in FIG. 1 comprises lastly, as is usual, a central control unit 51, a register 52, a translator 53 and a status memory 54. The register 52, via the control circuit 55 and a link 56, delivers scanning pulses to the functional receive unit 21F making it possible to switch successively each receive unit 21F photodiode to its output line 22F and therefore to explore the sources 11 of the transmit board 10 cyclically. The signals resulting from this exploration are retransmitted by the link 22F to the register 52 allowing it:

(a) to detect communication events (new call, hanging up) through comparison of the subscriber line present condition with the previous condition as stored in the memory 54, (b) to register the dialing signals emitted by the subscriber.

The register 52 thus has the necessary information for making or breaking a communication. For this purpose, it can:

(a) rely on the translator 53 in order to know the correspondence between a called directory number and the physical address of the called party within the switching network;

(b) govern the dialing signal generator 14 (to which it is connected via a link 57), (c) and finally, deliver information to the central control unit 51 via a link 58 which in particular authorizes the said control unit to supervise operation of the switching network and to charge the caller at the end of the call.

Given below is a summary of how the switching network in FIG. 1 works in the event of a call, where the subscriber A is the calling party and the subscriber B the called party. The term "receiver assembly" is employed to describe the component configuration including a receive unit 21, its address recognition circuit 24, its control circuit 25 and its switching circuit 26.

Generally speaking, the transmit board 10 transmits, through its dialing source N, pairs of addresses including either the address of a subscriber A, B, C, D, . . . and the address of a tone generator T or the address of two subscribers.

If for example, the transmit board 10 transmits "address of A+address of B", the receiver assembly 21A recognizes its own address (address of assembly A) and switches cell b of 21A to outgoing line 22A and the receiver assembly 21B recognizes its own address (address of B) and switches cell a of assembly 21B to outgoing line 22B.

If for example, the transmit board 10 transmits "address A+address of a tone source T", the receiver assembly 21A recognizes its own address (address of assembly A) and switches cell t of 21A to outgoing line 22A. Therefore, subscriber A receives the tone which is being transmitted.

(a) subscriber A lifts the receiver and consequently 11A lights up;

(b) the register 52, noting during its scanning operation that a change in the condition of the receiving unit 21F photodiode a has occurred through comparison with its previous condition as stored in the status memory 54, records the event (new call) and triggers the emission of a couple of signals "address of A+address of a dialing tone generator" from the generator 14 governing the source 11N, where the second address is, for example, that of the source 11T assigned to the calling tone;

(c) the receive unit 21A which upon recognizing the address of A in the pair of signals received by its photodiode n, switches the appropriate diode t to the link 22A thus sending the calling tone to A;

(d) the subscriber A therefore receives the signal inviting him to dial B's number on his telephone;

(e) the register 52 on stand-by for a dialing operation while cyclically scanning the subscriber A (photodiode a of recieve unit 21F) records B's number as dialed by A, causes the generator 14 and the source 11N to emit a couple of signals "address of A+address zero" upon receiving the first dialed figure to stop emission of the dialing tone, consults with the translator 53 after recording in order to deduce B's address, checks as to whether B is free and if so, causes the generator 14 and the source 11N to emit a couple of signals "address of B+address of a ringing tone generator" and then a couple of signals "address of A+address of a ringing back tone generator";

(f) the receive unit 21B recognizes itself upon reading the address of B and switches over its photodiode t to the appropriate ringing tone;

(g) the receive unit 21A recognizes itself upon receiving the address of A and switches over to the appropriate ringing back tone photodiode t;

(h) when subscriber B lifts the receiver, the register 52, that continues sequentially scanning the transmit board 10 thanks to its functional receive unit 21F, detects that the source 11B has flipped from rest to the active condition, is informed by its status memory 54 that subscriber B is replying to the cell, triggers the emission by the generator 14 and the source 11N of a couple of signals "address of B+address of A" and provides the central control unit 51 with the necessary taxing data;

(i) the receive unit 21A recognizes itself and switches over to the source 11B whereas the receive unit 21B recognizes itself and switches over to the source 11A;

(j) when a subscriber (eg A) hangs up, the register 52 via its functional receive unit 21F detects that the source A has flipped from the active condition to rest, causes the generator 14 and the source 11N to emit a couple of signals "address of A+address zero" and then a couple signals "address of B+address of a dialing tone (or communication cut off) generator" and advises the central control unit 51 of the end of the call;

(k) the receive unit 21A recognizes itself and breaks the optical link with the source 11B;

(l) the receive unit 21B recognizes itself and switches over to the source 11N (dialing tone); subscriber B may then either dial a number or hang up.

Figure 2:
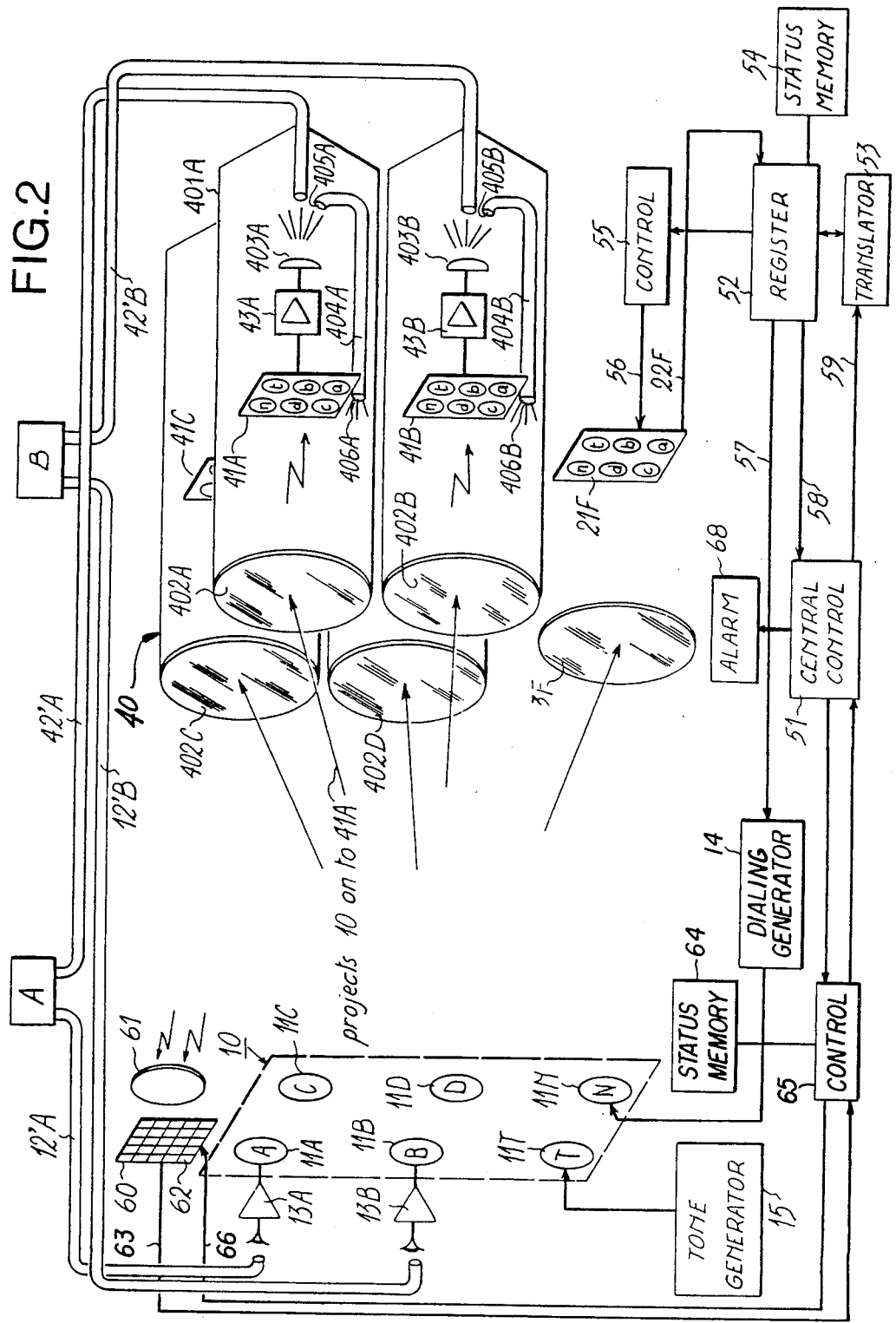
FIG. 2 is a diagram of an optoelectronic switching network as claimed in the invention.

Depicted in FIG. 2 which shows the switching network in accordance with the invention, are the transmit board 10, the transmit units 11 and the subscriber lines 12 connected to these transmit units. The subscriber lines are optical fibers or metal conductors.

The receive board 40 includes plural multicell receive units 41, enclosed inside a sighting tube 401 fitted with the optical projector 402. Each sighting tube 401 also houses a light source or injector 403 optically coupled to outgoing optical fiber 42. An amplifier 43 connected to the receive unit 41 output feeds the light injector 403 with a signal indicative of the image projected on one of the detectors of unit 41.

The circuits 24, 25 and 26 of FIG. 1 which, together with the receive units 21, form the receiver assemblies are not shown in FIG. 2 but it is assumed that they are associated with the receive units 41 of FIG. 2 exactly in the same way as they are associated with the receive units 21 of FIG. 1.

The optical retransmission means associated with each receive unit 41 comprises an optical fiber 404, having a first end 405 which captures a fraction of the light flux emitted by the light injector 403 and lost in the coupling with the optical fiber 42. A second end 406 of fiber 404 restitutes this fraction of flux substantially in the plane of the receive unit 41. The optical fiber 404 may be quite simply replaced by a sighting tube designed to be internally reflective for this purpose.

As a result, when a receive unit 41 is controlled by the control circuit 25 (FIG. 1) or when the functional receive unit 21F is controlled by the control circuit 55 for switching one of its cells to the outgoing line or 42F respectively, the switch-over, once performed, is visible from the light source that the illuminated end 406 then becomes, thereby providing a check that the photodiode 403 is indeed transmitting a light signal to the said outgoing link 42.

Should the source 406 go out, this means either that the receive unit 41 is not involved in the communication or that it is faulty, or that the amplifier 43 or the injector 403 are faulty.

Surveillance is provided by a supervision multicell receive unit 60 fitted with an optical system 61 and arranged in the transmit board 10 plane.

Receive unit 60 comprises as many cells as there are receive units 41 in the receive board 40. The objective lens 402 converges the beams leaving the end source 406 on the supervision receive unit 60, the end 406 being centered for this purpose on the receive unit 60 image produced by the optical lens 402. The objective lens 61 forms the receive board 40 image on the supervision receive unit 60, thus directing the beams emitted by a source 406 towards the corresponding cell 62. A control circuit 65 delivers scanning pulses to the supervision receive unit 60 via a control link 66 for successively scanning the cells 62. The latter are switched one after another onto a link 63 wich successively conveys the signals received by the said cells to the control unit 65. The control unit 65 can thus determine whether the receive board equipment is functioning correctly, in the same way the control unit 55 (FIG. 1) checked that the transmit board equipment was functioning correctly.

The control unit 65 is connected to a status memory 64 which informs unit 65 of all the changes in the conditions of the receive units (eg reception of a signal on a cell whereas the status memory 64 consulted indicates the absence of any signal on this cell during the previous exploration). Were this change in condition not to correspond to a normal event (eg a communication made or cut off), the central control uhit 51 advises an alarm device 68 to this effect.

Figure 3:
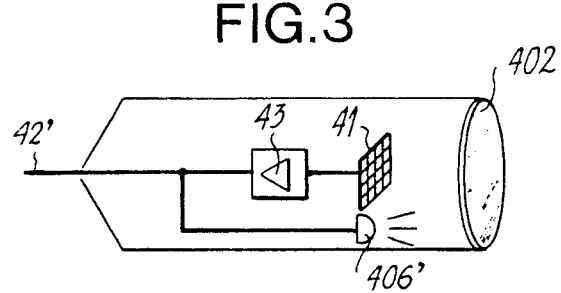
FIG. 3 is a diagram of a receive unit which becomes luminous in its active condition.

In the event of electrical, rather than optical outgoing links, only that part downstream of the amplifier 43 lying in each receive unit is modified as represented in FIG. 3. FIG. 3 shows the modifications made. The light injector 403 is removed; the outgoing electrical link 42' directly connected to the output of amplifier 43 replaces the optical fiber 42, and a light source 406' (light emitting diode) connected to the outgoing electrical link 42' replaces the end 406 of optical fiber 404.

Figure 4:
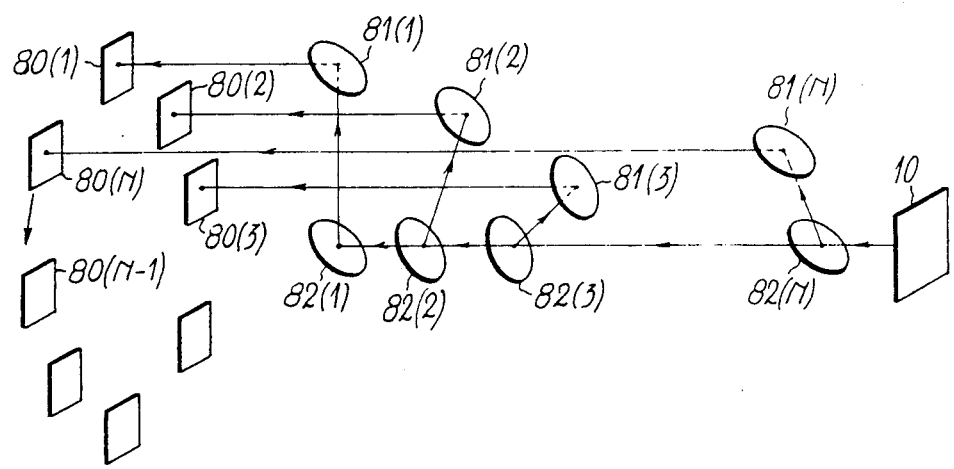
FIG. 4 is a diagram of an optoelectronic switching network as claimed in the invention in which the receive board is divided into several sections.

With reference now to FIG. 4, opposite the transmit board 10 are N receive sub-boards $80_1$ to $80_N$ arranged in a star configuration but nevertheless mutually parallel, with an angular pitch equal to or less than $2\pi/N$ radians. Each of these sub-boards is illuminated by means of a total reflection reflector $81_1$ to $81_N$ respectively, centered on the axes of the said sub-boards and by means of partial reflection, i.e., semi-transparent mirrors $81_1$ to $82_N$ centered on optical axis of transmit board 10 and parallel to the corresponding reflector 81. All the reflectors 82 are semi-transparent with the exception of the reflector $82_1$ which is of the total reflection type since it receives the last fraction of a light flux from the transmit board 10. Each of the reflectors 82 is inclined to the transmit board axis at 45°, such that the image from the associated reflector 81 through the reflector 82 in question is centered on the transmit board 10 axis. The parallelism of the associated reflectors ensures the parallelism of the transmit board images.

The reflection and transmission coefficients of the $N-1$ reflectors $82_2$ to $82_N$ are such that each of the N receive sub-boards $80_1$ to $80_N$ receive a fraction F/N of the light flux F delivered by the transmit board 10. It can immediately be observed that N receive sub-boards 80, if substituted for a single reflector board comprising C multicellular receivers, each comprise C/N receivers and that the ratio of their dimensions to those of this single board is $1/\sqrt{N}$.

What I claim is:

1. An optoelectronic switching network comprising:
   a transmit board formed by a plurality of transmit units each including a light source, said light sources being connected respectively to subscriber incoming lines and being arranged matrically in said transmit board;
   a receive board formed by a plurality of receive units, each receive unit including plural optoelectronic cells, said cells being selectively connectable to subscriber outgoing lines and being arranged matrically in said receive units;
   an optical system for projecting an image of the transmit board onto the receive units so that in each receive unit images of the sources of the transmit board coincide with the optoelectronic cells of said receive units;

each receive unit further including illuminating means for projecting an image in response to any cell of the particular receive unit being illuminated by an image of the transmit board by way of the optical system;

a supervision receive unit in proximity to the transmit board with supervision optoelectronic cells having projected thereon images from the illuminating means of the receive units;

means for scanning said supervision optoelectronic cells; and each of the receive units comprising: (a) a housing internally coated with a reflecting layer, and (b) receive unit illumination means controlled by the activation of the optoelectronic cells of the receive unit.

2. An optoelectronic switching network comprising:

a transmit board formed by a plurality of transmit units each including a light source, said light sources being connected respectively to subscriber incoming lines and being arranged matrically in said transmit board;

a receive board formed by a plurality of receive units, each receive unit including plural optoelectronic cells, said cells being selectively connectable to subscriber outgoing lines and being arranged matrically in said receive units;

an optical system for projecting an image of the transmit board onto the receive units so that in each receive unit images of the sources of the transmit board coincide with the optoelectronic cells of said receive units;

each receive unit further including illuminating means for projecting an image in response to any cell of the particular receive unit being illuminated by an image of the transmit board by way of the optical system;

a supervision receive unit in proximity to the transmit board with supervision optoelectronic cells having projected thereon images from the illuminating means of the receive units;

means for scanning said supervision optoelectronic cells, the subscriber incoming and outgoing lines being optical fibers, each of the illuminating means including a light source and an additional optical fiber, the light source of each illuminating means being controlled in response to the activation of the optoelectronic cells of the receive unit, the light source supplying optical energy to the additional fiber and to the subscriber optical fiber line for the particular receiver unit, the additional optical fiber being an optical source for illuminating the supervision receive unit.

3. An optoelectronic switching network comprising:

a transmit board formed by a plurality of transmit units each including a light source, said light sources being connected respectively to subscriber incoming lines and being arranged matrically in said transmit board;

a receive board formed by a plurality of receive units, each receive unit including plural optoelectronic cells, said cells being selectively connectable to subscriber outgoing lines and being arranged matrically in said receive units;

an optical system for projecting an image of the transmit board onto the receive units so that in each receive unit images of the sources of the transmit board coincide with the optoelectronic cells of said receive units;

each receive unit further including illuminating means for projecting an image in response to any cell of the particular receive unit being illuminated by an image of the transmit board by way of the optical system;

a supervision receive unit in proximity to the transmit board with supervision optoelectronic cells having projected thereon images from the illuminating means of the receive units;

means for scanning said supervision optoelectronic cells, the subscriber incoming and outgoing lines being wide band metal lines, each of the illuminating means including a light source for illuminating the supervision receive unit, the light source being controlled by the activation of the optoelectronic cells of the receive unit, said cells of each receive unit feeding both the outgoing line of the particular receive unit and the light source of the particular receive unit.

4. An optoelectronic switching network comprising:

a transmit board formed by a plurality of transmit units each including a light source, said light sources being connected respectively to subscriber incoming lines and being arranged matrically in said transmit board;

a receive board formed by a plurality of receive units, each receive unit including plural optoelectronic cells, said cells being selectively connectable to subscriber outgoing lines and being arranged matrically in said receive units;

an optical system for projecting an image of the transmit board onto the receive units so that in each receive unit images of the sources of the transmit board coincide with the optoelectronic cells of said receive units;

each receive unit further including illuminating means for projecting an image in response to any cell of the particular receive unit being illuminated by an image of the transmit board by way of the optical system;

a supervision receive unit in proximity to the transmit board with supervision optoelectronic cells having projected thereon images from the illuminating means of the receive units;

means for scanning said supervision optoelectronic cells, the receive board being split into plural receive sub-boards arranged in a star configuration, the optical system including plural reflecting mirrors having axes perpendicular to the respective sub-boards at the centers thereof and plural semi-transparent mirrors respectively associated with the reflecting mirrors and having a common axis perpendicular to the transmit board at the center thereof.

* * * * *